United States Patent [19]

Wössner

[11] Patent Number: 4,706,787
[45] Date of Patent: Nov. 17, 1987

[54] VIBRATION DAMPER WITH VARIABLE DAMPING FORCE

[75] Inventor: Felix Wössner, Schweinfurt, Fed. Rep. of Germany

[73] Assignee: Fichtel & Sachs AG, Schweinfurt, Fed. Rep. of Germany

[21] Appl. No.: 6,964

[22] Filed: Jan. 27, 1987

Related U.S. Application Data

[62] Division of Ser. No. 808,292, Dec. 12, 1985, Pat. No. 4,671,392.

[30] Foreign Application Priority Data

Dec. 18, 1984 [DE] Fed. Rep. of Germany ....... 3446133

[51] Int. Cl.$^4$ ........................... F16F 9/46; F16F 9/14; B60G 11/26
[52] U.S. Cl. ............................... 188/299; 267/64.15; 280/707
[58] Field of Search ............... 188/266, 297, 299, 316, 188/319, 322.22, 322.15; 267/8 R, 64.15, 64.16; 280/707, 709; 92/143, 163

[56] References Cited

U.S. PATENT DOCUMENTS 2,976,961  3/1961  Mead ................................. 188/299
4,159,106  6/1979  Nyman ............................. 267/64.15

FOREIGN PATENT DOCUMENTS 2119531  11/1971  Fed. Rep. of Germany .
3303293   1/1984  Fed. Rep. of Germany .
1298511   6/1962  France ............................. 188/322.15
0084241   5/1983  Japan ................................. 188/299

Primary Examiner—George E. A. Halvosa
Assistant Examiner—Robert J. Oberleitner
Attorney, Agent, or Firm—Walter Ottesen

[57] ABSTRACT

A vibration damper for vehicles is disclosed with a variable damping force. The vibration damper includes two series-connected damping valve systems which effect a damping force variation by means of a blockable bypass passage. An externally influenceable damping force in at least three stages is obtained in that the bypass passage bridges the two series-connected damping valve systems. This bypass passage has outer passages which open into the chambers separated by the damping valve arrangement and a further intermediate passage which opens to a space between the damping valve systems. At least two passages are closable to change the damping of damping fluid displaced between said chambers.

1 Claim, 9 Drawing Figures

Fig. 6
Fig. 7
Fig. 8
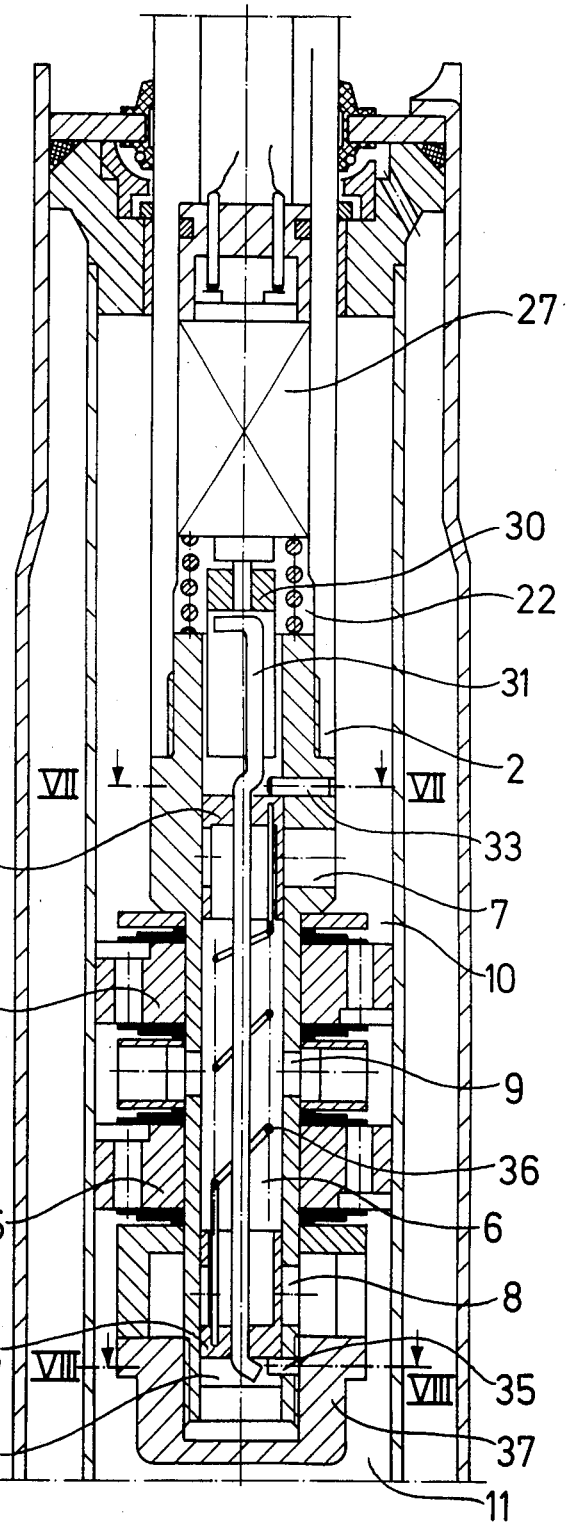
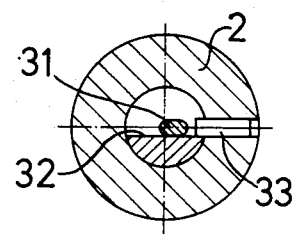
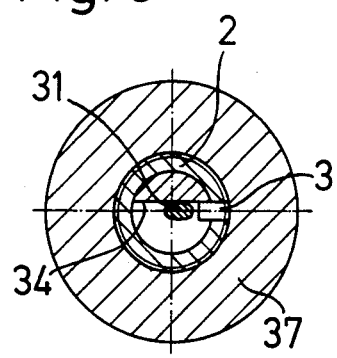

VIBRATION DAMPER WITH VARIABLE DAMPING FORCE

This is a division of application Ser. No. 808,292 filed Dec. 12, 1985, now U.S. Pat No. 4,671,392.

FIELD OF THE INVENTION

The invention relates to a vibration damper wth variable damping force for motor vehicles. The vibration damper includes a damping valve device through which a damping medium is displaced from a first chamber to a second chamber as a consequence of the movement of the vehicle bodywork with respect to the axle of the vehicle.

BACKGROUND OF THE INVENTION

Damping valve devices for vibration dampers which provide a two-fold adjustment are disclosed, for example, in German published Patent Applications DE-OS No. 21 19 531 and DE-OS No. 33 03 293. Especially DE-OS No. 21 19 531 shows two series-connected damping valve systems with a blockable bypass passage which serves to bridge one damping valve system. It is in this case disadvantageous that the one or the other damping valve system cannot be selectively actuated. Accordingly, it is not possible to design the required characteristic curve for each particular use situation.

In these known vibration dampers the damping characteristic curve is essentially varied only between a setting for soft damping and a setting for hard damping. In order to optimize the driving behavior of vehicles, an externally influenceable damping force variation for more than two stages is desired. Low damping forces are desired in the case of slow driving, for example, for city trips at speeds up to 50 kph; medium damping forces on country roads at speeds up to 100 kph; and, high damping forces for fast highway trips from 120 kph. A slight, that is very soft, damping is provided for the slow driving range only according to considerations of comfort; however, a vehicle with this setting becomes unsafe and unreliable for fast trips. For such cases, an automatic variation of the damping should be provided which is preferably dependent upon the driving speed.

SUMMARY OF THE INVENTION

It is an object of the invention to provide a vibration damper for which the externally influenceable damping force is variable in at least three stages with a predetermined and desired damping force characteristic being assigned to each stage. The variation of the damping force should be effected with the simplest possible means with high operational reliability being required for the setting of each required damping characteristic curve.

The vibration damper of the invention includes a housing and a valve arrangement which partitions the housing into two chambers between which fluid flows in response to relative movement of the bodywork and axle of the vehicle. The valve arrangement includes two series-connected damping valve systems which are bridged by a bypass channel. The bypass channel has outer passages communicating with respective ones of the chambers. The bypass channel has further central passages which are arranged between damping valve systems. At least two of the passages can be closed off. Thus, it is possible to precisely actuate the one and the other damping valve system and obtain two mutually independent push and pull characteristic curves which are adapted to the damping force course required in each case, while in a third stage a damping force course is produced which results from the sum of the push and pull characteristic curves of the two series-connected damping valve systems with the bypass passage being closed in this stage. The control of the two passages results in very high operational reliability for the setting of the damping characteristic curve required in each case.

With the arrangement of two central passages, it is readily possible to control these separately and thereby achieve the three-stage damping force variation. According to the invention, it is especially advantageous if the external passages connected with the bypass channel are made blockable, while the centrally arranged passages are in the form of a constantly open passage. In this way, the centrally arranged passages can be formed very simply by one or more openings which open into the bypass channel and lie in a cross-sectional plane, so that the damping valve arrangement for varying the damping force can be made relatively short in the axial direction. In this embodiment and according to a further feature of the invention, the control elements for blocking of passages are formed by slider valves which are of simple configuration and actuable without problems for the blocking of the passages.

In accordance with another embodiment of the invention, the slider valves are formed by axial sliders which are in operative connection with an axially movable control rod. Here, each axial slider is loaded by a spring which brings it, without the action of the setting force of the control rod, into the closure position of the passage associated therewith. A stop is arranged in the bypass passage for each axial slider for limiting the axial movement. A very simple operative connection between the control rod and the respective axial sliders is obtained according to further features of the invention in that the control rod actuated by the adjusting device is provided with an abutment for each axial slider. In this way, upon actuation of the one axial slider, the abutment acts thereon; whereas, the other axial slider is out of operative engagement with the abutment associated therewith.

In a further embodiment of the invention, the slider valves are configured as rotary sliders. In this case, it is advantageous if the rotary sliders are arranged on a common actuating shaft and the selective blocking of the passages is preferably effected by rotation of the actuating shaft to the right or left. By appropriate arrangement of the passages in relation to the rotary sliders, the one or the other passage or both passages can be selectively closed.

Both the embodiment with axial sliders and that with rotary sliders is connected with a very simple adjusting device acting upon the control rod or actuating shaft. The adjusting device is formed merely by an electric drive according to a feature of the invention. However, it is readily possible in place of the electric drive to provide other known actuating means such as a mechanical, pneumatic or hydraulic drive.

In a further embodiment of the invention, the slider valves, in addition to the adjusting device, are connected with a return device which effects a closure of the passages when the adjusting device is de-energized. This measure in every case guarantees that even on failure of the adjusting device, the vibration damper will operate with high damping forces, so that the vehicle can be driven safely in every driving condition. This return device is formed in a simple manner by at least one mechanical spring.

With respect to the arrangement of the damping valve device working with variable damping force, relatively wide discretion is guaranteed. Thus it is readily possible for the damping valve device provided with variable damping force to be arranged in the interior of the vibration damper, in which case according to an advantageous embodiment of the invention, the two series-connected damping valve systems are formed by two pistons provided with damping valves mounted on a piston rod while the bypass passage bridging the damping valve systems is formed by a cavity of the piston rod and this cavity also accommodates the slider valves, the adjusting device and the return device if provided.

According to a further feature of the invention, it is readily possible for the two series-connected damping valve systems to be arranged in a housing spatially separated from the container and connected by means of a connecting conduit and for this housing to also accommodate the bypass passage bridging the damping valve systems, the slider valves, the adjusting device and the return device if provided; whereas, on one side of the damping valve systems, a connecting conduit leading to the container opens into the housing and, on the other side of the damping valve systems, a connection conduit is arranged in the housing and leads to a pressure vessel which accommodates the second chamber.

The damping valve device of variable damping force is suitable not only for two-tube vibration dampers with and without bottom valve, pressureless or with gas pressure pretensioning but also for single-tube vibration dampers with gas pretensioning.

BRIEF DESCRIPTION OF THE DRAWING

The invention will be discussed in greater detail with reference to the drawing wherein:

FIG. 6 shows a damping valve device, in longitudinal section, of a two-tube vibration damper, the damping valve device being provided with a return device;

FIG. 7 is a section view taken along line VII—VII of FIG. 6;

FIG. 8 is a section view taken along line VIII—VIII of FIG. 6; and,

DESCRIPTION OF THE PREFERRED EMBODIMENTS OF THE INVENTION

Figure 1:
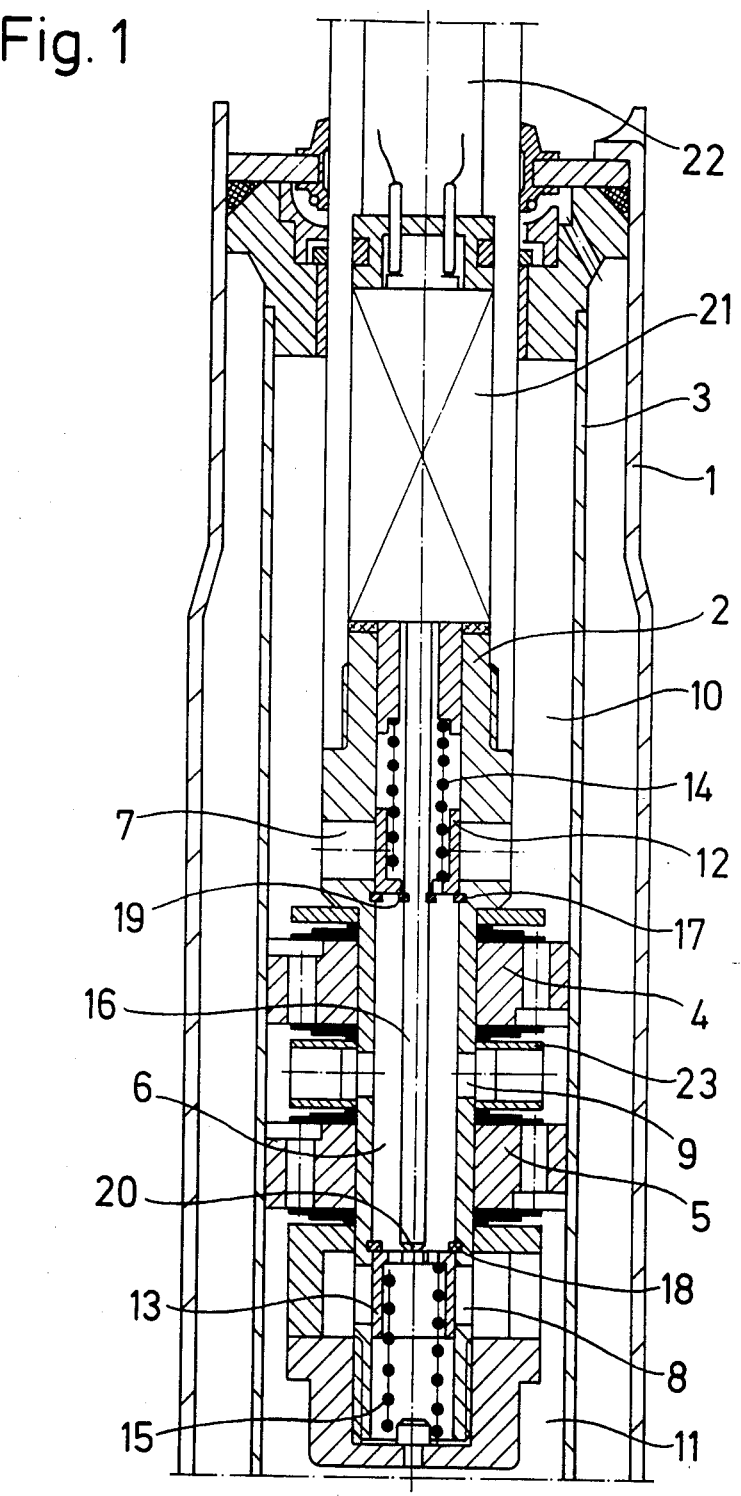
FIG. 1 shows a detail of a two-tube vibration damper in longitudinal section.

In the two-tube vibration damper shown in FIG. 1, a cylinder 3 is arranged coaxially in the vibration damper container 1 and a piston rod unit 2 is guided in a piston rod guide and sealed to the exterior by means of a piston rod seal. The piston rod 2 is made up of an extension piece and a cylindrical part. In a vehicle (not shown) and by way of example, the piston rod unit 2 is connected with the vehicle bodywork and the vibration damper container 1 is connected with the vehicle axle, so that with movement of the vehicle bodywork in relation to the vehicle axle, the piston rod unit 2 carries out an axial movement in the cylinder 3.

A damping valve device is formed by a first damping valve system 4 and a second damping valve system 5 which are secured firmly on the extension piece of the piston rod unit 2 and are configured as pistons of the vibration damper. A bypass passage 6 is centrally arranged in the extension piece on the piston rod unit 2 and bridges the two series-connected damping valve systems 4 and 5 while an upper passage 8 and a middle passage 9 open into the bypass passage 6. In the central bore defining the bypass passage 6, there are an upper axial slider 12 and a lower axial slider 13. The upper axial slider 12 is biased by a spring 14 against a stop 17 arranged in the bypass passage 6 and the lower axial slider 13 is resiliently biased by spring 15 against a lower stop 18. Above the damping valve systems 4 and 5 there is a working chamber 10 while a working chamber 11 is provided below. The working chambers 10 and 11 are filled with damping fluid.

An electromagnet 21 is arranged in a cavity of the piston rod unit 2 and serves as an electric drive. The electromagnet 21 is connected to a control rod 16. A stop 19 coacts with the upper axial slider 12; whereas, the control rod 16 has a striking face 20 for actuating the lower axial slider 13. By energizing the electromagnet 21 arranged in the cavity 22 of the piston rod unit 2, the control rod 16 can be drawn upwardly or pressed downwardly. In each direction of movement of the control rod 16 only one axial slider 12 or 13 is actuated. Stated otherwise, in each case only one of the outer passages 7 and 8 is cleared.

In the position illustrated, the electromagnet 21 is not energized and the control rod 16 is situated in its mid position so that the upper axial slider 12 closes off the outer passage 7 and the lower axial slider 13 closes off the outer passage 8. The axial sliders 12 and 13 are pressed into this closure position by the springs 14 and 15. With an axial movement of the piston rod unit 2 in the cylinder 3, the damping fluid displaced in the working chambers 10 and 11 is damped by the two damping valve systems 4 and 5 so that the maximum damping effect is achieved in this position.

If the control rod 16 is pressed downwardly by the electromagnet 21, the displacement force is transmitted via the striking face 20 to the lower axial slider 13 and the latter is displaced downwardly against the force of the spring 15 thereby opening the outer passage 8. In this position and by way of example, the damping fluid flows out of the working chamber 10 through the first damping valve system 4 and then through the bores arranged in the spacer piece 23 and the central passage 9 into the bypass passage 6 and thence through the opened outer passage 8 into the working chamber 11, so that only the damping effect of the damping valve system 4 is effective, since the bypass passage 6 is made so large in cross-section that no appreciable damping force occurs due to it. By appropriate design of the first damping valve system 4, a slight damping force can be achieved in this position which is allocated for example to the slow driving range in town trips of up to 50 kph.

When the control rod 16 is pulled upwardly by the electromagnet, first the lower axial slider 13 closes the outer passage 8 under the action of the force of the spring 15 and comes into abutting engagement with the stop 18. Further upward displacement of the control rod 16 beyond the middle position causes the stop 19 to abut on the upper axial slider 12 and push the latter upwardly against the force of the spring 14 while the striking face 20 lifts away from the lower axial slider 13. The upward displacement of the axial slider 12 opens the outer passage 7 and connects the same with the bypass passage 6, so that an outward movement of the piston rod unit 2 has the effect that damping fluid from the working chamber 10 is displaced by way of the outer passage 7 and the bypass passage 6 and by way of the central passage 9 and the second damping valve system 5 into the working chamber 11. Since this second damping valve system 5 is designed, for example, with respect to the characteristic curve so that it generates the damping forces desired for speeds up to 100 kph, a second stage for the damping effect in this position is obtained.

When the electromagnet 21 is de-energized, the upper axial slider 12 is then brought to abut on the stop 17 by the force of the spring 14 and thus the outer passage 7 is closed. As before, the lower axial slider 13 is also closed, so that now the full damping action of the two series-connected damping valve systems 4 and 5 is again present. Thus, the damping force setting is produced which corresponds to high motorway speeds above 120 kph and represents the third stage. With the electromagnet 21 not energized, the highest damping force stage is automatically set because the springs 14 and 15 automatically bring the respective axial sliders 12 and 13 into the closed position thereby closing the outer passages 7 and 8. Accordingly, in the case of a failure of the electromagnet 21 (for example, due to current interruption) the assurance is provided that the vehicle can be driven safely in every driving condition, in which case a reduction in riding comfort has to be accepted at low speeds.

Figure 2:
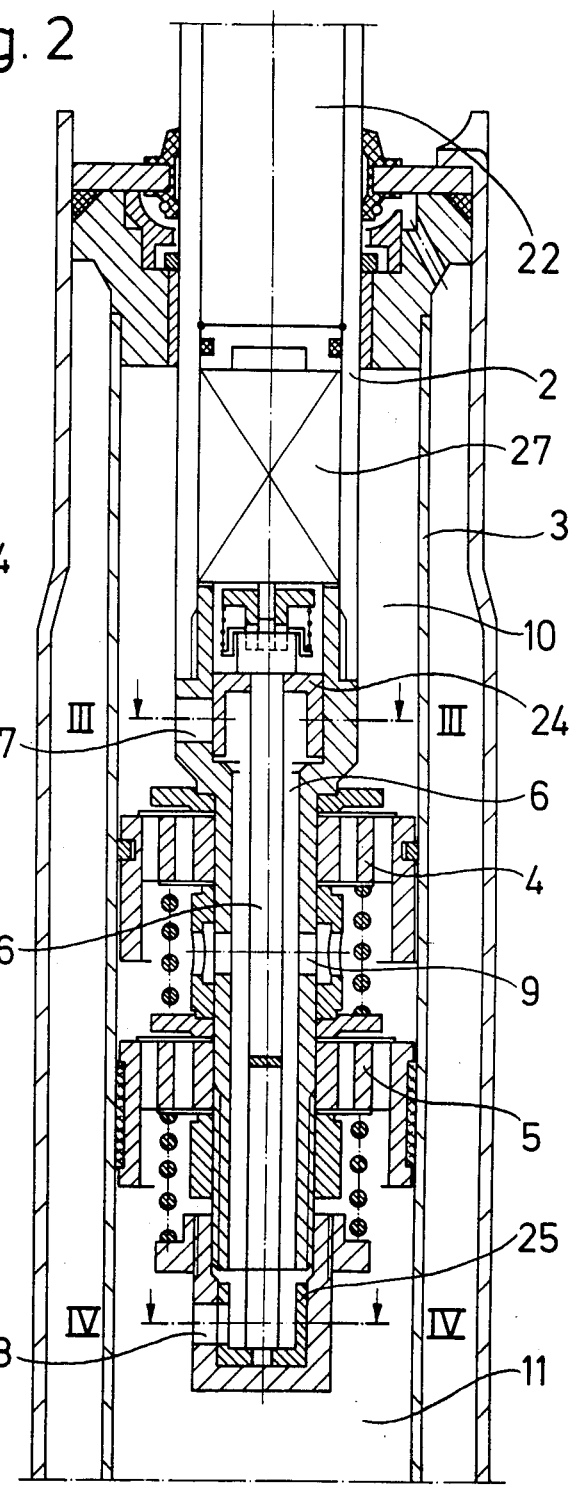
FIG. 2 shows a detail, in longitudinal section, of a two-tube vibration damper with a damping valve device controlled by rotary sliders.

The embodiment of FIG. 2 differs from that of FIG. 1 essentially in that the opening and closing of the outer passages 7 and 8 are effected by rotary sliders 24 and 25. In this embodiment, the damping valve systems 4 and 5 are again formed as pistons which are fixedly attached to the piston rod unit 2. The bypass passage 6 can also bridge the two damping valve systems 4 and 5 with the outer passage 7 opening into the working chamber 10 and the other outer passage 8 opening into the working chamber 11. The rotary sliders 24 and 25 are mounted on a common actuating shaft 26 for rotation therewith. The shaft 26 is connected with an electric drive 27 consisting preferably of a motor and gearing and is mounted in the cavity of the piston rod unit 2. The selective opening and closing of the outer passages 7 and 8, which open into the bypass passage 6, are effected by rotation of the rotary sliders 24 and 25 with corresponding openings of the rotary sliders 24 and 25 coacting with the passages 7 and 8, respectively.

Figure 3:
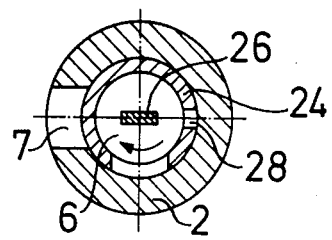
FIG. 3 is a section view taken along the line III—III of FIG. 2.
Figure 4:
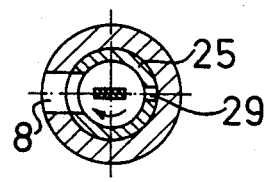
FIG. 4 is a section view taken along line IV—IV of FIG. 2.

When the rotary sliders 24 and 25 are in the position as shown in FIG. 2, the outer passage 7 is closed while the outer passage 8 is opened. The damping is effected, for example, with a reduction of the working chamber 10 caused by a flow of the damping fluid through the first damping valve system 4, then through the middle passage 9, bypassing the second damping valve system 5, and then through the outer passage 8 into the working chamber 11. The damping effect of the piston rod movement is thus effected simply by the damping valve system 4. FIGS. 3 and 4 show the position of the rotary sliders 24 and 25 for this first stage of damping described above.

On rotation of the actuating shaft 26 by the electric motor 27 through 90°, the rotary slider 24 opens the outer passage 7 to the bypass passage 6, while the lower rotary slider 25 closes the outer passage 8. Now the damping fluid flows out of the chamber 10 through the outer passage 7, the bypass passage 6 and the central passage 9 and via the damping valve system 5 into the working chamber 11.

In this way, the second stage for the damping force is set which provides, for example, medium damping forces and corresponds to speeds of up to 100 kph.

A further rotation of the rotary sliders 24 and 25 through 90° has the effect that the lead opening 28 of the rotary slider 24 and the lead opening 29 of the rotary slider 25 arrive at the region of the outer passages 7 and 8. Thus, in parallel with the series-connected effective damping valve systems 4 and 5, a throttled bypass opening becomes effective and thus a third stage is provided for the damping effect. The size of the lead openings 28 and 29 can here be selected so that the third stage damps with substantially greater intensity than the second stage, but lies approximately between the second and fourth stages. On further rotation of the rotary sliders 24 and 25 through 90°, the outer passages 7 and 8 are closed, so that the full damping effect of the series-connected damping valve systems 4 and 5 is effective and thus the maximum damping is achieved as a fourth damping stage.

Figure 5:
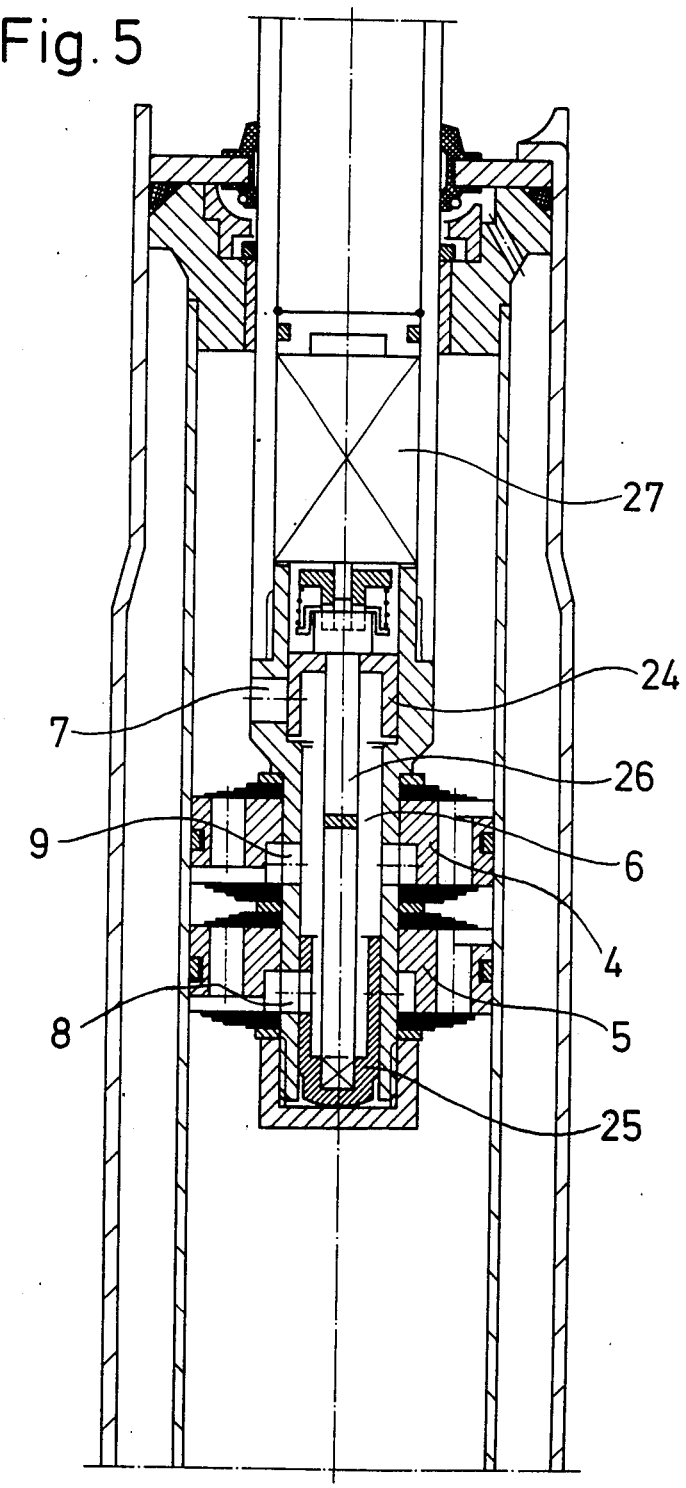
FIG. 5 is an embodiment of a damping valve device of variable damping force with short axial extent, in longitudinal section.

FIG. 5 shows a configuration of the damping valve device which is very compact in the axial direction. The parts used for achieving the variable damping force differ essentially only in somewhat modified dimensions and a modified passage arrangement and are provided with the same reference numerals as corresponding parts in the embodiment of FIGS. 2, 3 and 4. The operation of the embodiment of FIG. 5 corresponds to that of FIGS. 2, 3 and 4.

In a further embodiment shown in FIG. 6, the electric drive 27 is mounted in the cavity 22 of the piston rod unit 2 and includes a motor and gearing. The drive 27 is connected with a coupling piece 30 which is slotted to receive the offset of an actuating shaft 31. The upper rotary slider 24 is provided with a striking face 32 which forms an abutment for both a strike pin 33 and the offset of the actuating shaft 31. The lower rotary slider 25 likewise has a strike face 34 which coacts with the offset of the actuating shaft 31 and a striker pin 35. The one end of a return spring 36 is connected with the upper rotary slider 24 and the other end of the return spring 36 is connected with the lower rotary slider 25. This return spring on the one hand presses the two rotary sliders 24 and 25 in the axial direction against the stop pins 33 and 35, respectively, and on the other hand, when the electric drive 27 is not energized, brings the rotary sliders into the closure position for the outer passages 7 and 8 by means of its torsional force. On assembly, the parts arranged in the cavity 22 of the piston rod unit 2 form one component unit with a securing nut 37 tightening the damping valve systems 4 and 5 on the extension piece of the piston rod unit 2.

FIGS. 6, 7 and 8 show a position of the rotary sliders 24 and 25 which closes the outer passages 7 and 8. When the electric drive 27 is not energized, the torsion force of the return spring 36 brings the rotary sliders 24 and 25 into this position while these abut with the striker faces 32 and 34 on the striker pins 33 and 35, respectively. In this position of the rotary sliders 24 and 25 shown in FIGS. 6, 7 and 8, the damping forces desired at high speeds are provided because the two series-connected damping valve systems 4 and 5 are effective.

Starting from this position, if the electric drive 27 is actuated so that it carries out a rotation to the left, this direction of rotation is transmitted through the coupling piece 30 to the actuating shaft 31 with the offset of the actuating shaft 31 corresponding to the upper rotary slider 24 being able to rotate freely while the offset corresponding to the lower rotary slider 25 entrains the latter by an abutting engagement with the striker face 34. A rotation of the actuating shaft 31 through about 180° causes the striker face 34 to come into abutting contact with its other end on the stop 35, whereby the pass-through bore in the lower rotary slider 25 connects the outer passage 8 with the bypass passage 6. Since in this movement the upper rotary slider 24 remains closed, on an outward movement of the piston rod unit 2, damping fluid flows from the working chamber 10 first through the damping valve system 4 and then through the middle passage cross-section 9, the bypass passage 6 and the opened outer passage 8 into the working chamber 11. In this way, the damping force stage formed by the damping valve system 4 and corresponding to low speed is effective.

The middle damping force stage is obtained in that a rotation of the actuating shaft 31 to the right is initiated by means of the electric drive 27. As a result of the force of the return spring 36, the lower rotary slider 25 first closes the outer passage 8 and then the offset of the actuating shaft 31 corresponding to the upper rotary slider 24 comes against the striker face 32 of the upper rotary slider 24 and entrains the latter in the circumferential direction. On further movement of the actuating shaft 31 through about 180°, the other end of the striker face 32 comes into abutting engagement with striker pin 33 so that the bore of the upper rotary slider 24 connects the outer passage 7 with the bypass passage 6. In this position, the damping valve system 4 is bridged by the bypass passage 6 through the opened outer passage 7 and the middle passage 9, so that only the damping valve system 5 is effective which is configured for medium damping forces.

In every position in which a rotary slider 24 or 25 is to remain opened, a holding force is applied by the electric drive 27 to the actuating shaft 31 which acts against the torsion force of the return spring 36. On the other hand, the torsion force of the return spring 36 should be made so great so that when the electric drive 27 is switched off, the spring 36 returns the rotary sliders 24 and 25 to the closed position for the passages 7 and 8. In this way, on failure of current or a fault in the electric drive 27, the highest damping force stage is reliably and automatically set, so that safety of driving is guaranteed for every driving condition. The torsion force of the return spring 36 is selected so that when the electric drive 27 is not energized, the electric motor and the gearing can be returned to the zero position. It is readily possible to provide a coupling between the electric drive 27 and the coupling piece 30 which produces the connection only when the electric drive 27 is energized. Thus, it becomes possible to dimension the return spring 36 to provide a lower return force.

Figure 9:
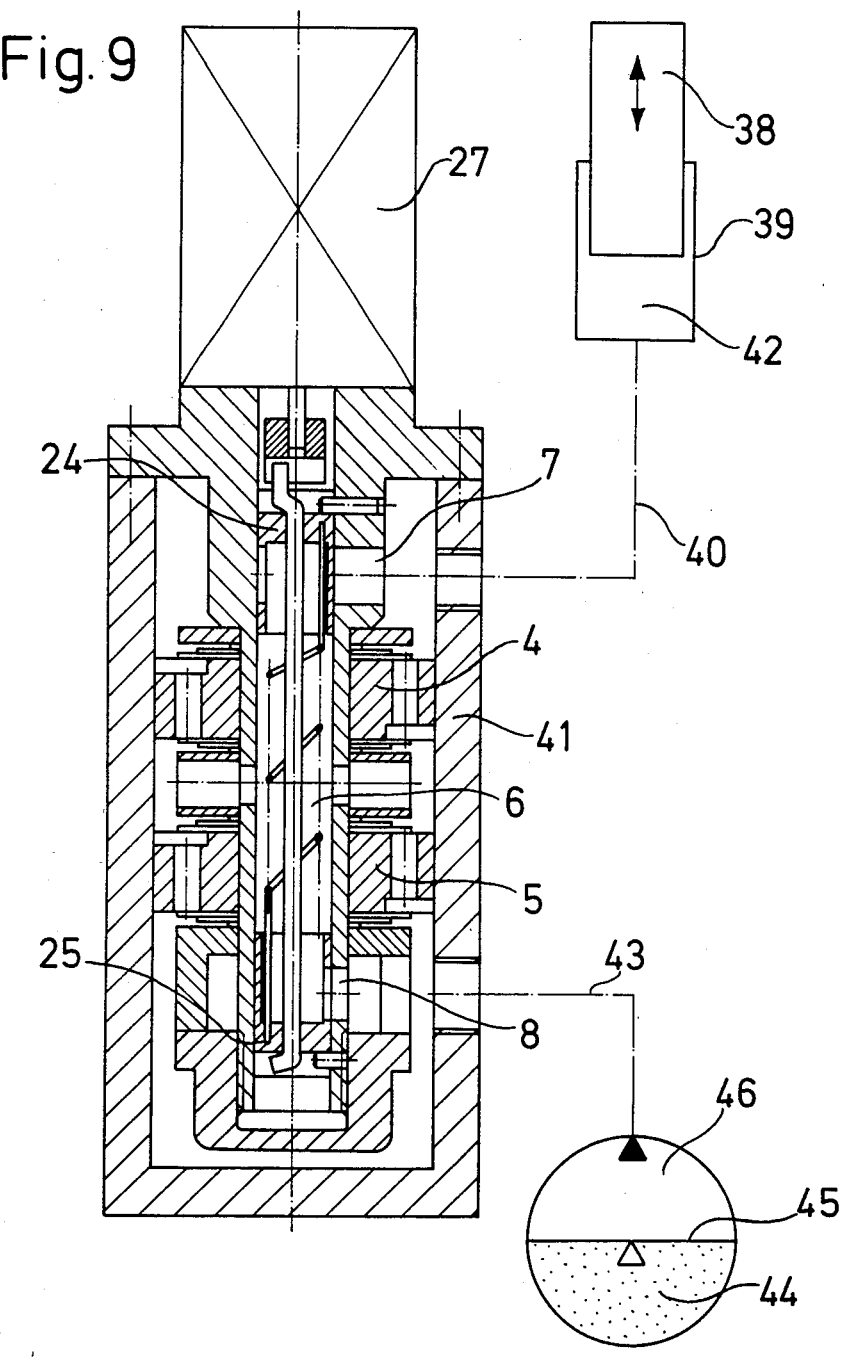
FIG. 9 is an embodiment of the damping valve device which is separately mounted in spaced relationship to a component arranged between the vehicle bodywork and the vehicle axle.

In the embodiment of FIG. 9, the two series-connected damping valve systems 4 and 5 are arranged in a housing 41 which is spatially separated from the unit arranged between vehicle bodywork and vehicle axle. This unit includes a displacement body 38 and a container 39 which conjointly define a displacement working chamber 42. This displacement working chamber 42 is connected by means of a connecting conduit 40 which opens into the housing 41 in the region of the outer passage 7. A connecting conduit 43 opens into the housing 41 in the region of the outer passage 8 and is connected to pressure vessel 44. The second chamber 46 is separated from a spring chamber under gas pressure by a movable partition wall 45. In this embodiment, the damping valve systems 4 and 5 are again actuable by means of a bypass passage 6 and rotary sliders 24 and 25 in correspondence with the embodiment of FIGS. 6, 7 and 8.

It is understood that the foregoing description is that of the preferred embodiments of the invention and that various changes and modifications may be made thereto without departing from the spirit and scope of the invention as defined in the appended claims.

What is claimed is:

1. A vibration damper apparatus for a motor vehicle having an axle and a bodywork, the vibration damper apparatus comprising:
   a displacement assembly mounted between the bodywork and the axle, the displacement assembly including a container for accommodating damping fluid and a displacement body movably mounted in said container for movement relative thereto in response to relative movement between said bodywork and said axle, said container and said displacement body conjointly defining a first chamber;
   a housing spatially separated from said container;
   a first fluid conducting conduit connecting said housing to said first chamber;
   a pressure container defining a second chamber;
   a second fluid conducting conduit connecting said housing to said second chamber;
   a damping valve assembly mounted in said housing and including:
   two damping valve systems connected in series between said chambers;
   a bypass channel bypassing said damping valve systems and communicating with said chambers via said connecting conduits, respectively;
   first outer passage means interposed between said first conduit and said bypass channel;
   second outer passage means interposed between said second conduit and said bypass channel;
   said two valve systems conjointly defining a space therebetween;
   intermediate passage means connecting said space to said bypass channel; and,
   a passage closure arrangement mounted in said housing for changing the damping forces developed by said vibration damper apparatus, the arrangement including:
   first closure means corresponding to one of said passage means for closing and opening the same;

second closure means corresponding to one other one of said passage means for closing and opening the same; and, actuation means for actuating at least one of said closure means to close off the passage means corresponding thereto thereby changing the damping of the damping fluid as it is displaced between said chambers.

* * * * *